(12) United States Patent
Jin

(10) Patent No.: US 10,221,815 B1
(45) Date of Patent: Mar. 5, 2019

(54) EXHAUST GAS RECIRCULATION VALVE FOR VEHICLE

(71) Applicants: Hyundai Motor Company, Seoul (KR); Kia Motors Corporation, Seoul (KR)

(72) Inventor: Seok Beom Jin, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/825,569

(22) Filed: Nov. 29, 2017

(30) Foreign Application Priority Data

Sep. 5, 2017 (KR) .......................... 10-2017-0113070

(51) Int. Cl.
| | |
|---|---|
| *F02M 26/71* | (2016.01) |
| *F02M 26/72* | (2016.01) |
| *F16K 11/02* | (2006.01) |
| *F02M 26/26* | (2016.01) |
| *F02M 26/25* | (2016.01) |
| *F16K 11/00* | (2006.01) |

(52) U.S. Cl.
CPC ............ *F02M 26/71* (2016.02); *F02M 26/25* (2016.02); *F02M 26/26* (2016.02); *F02M 26/72* (2016.02); *F16K 11/00* (2013.01); *F16K 11/02* (2013.01)

(58) Field of Classification Search
CPC ........ F02M 26/71; F02M 26/72; F02M 26/26; F02M 26/25; F16K 11/00

USPC ............................ 123/568.18, 568.12, 568.11
See application file for complete search history.

(56) References Cited

U.S. PATENT DOCUMENTS

| | | | | |
|---|---|---|---|---|
| 7,621,264 | B2 * | 11/2009 | Balsdon | F02M 26/26 123/568.12 |
| 2006/0042608 | A1 * | 3/2006 | Buck | F02B 29/0437 123/568.12 |

FOREIGN PATENT DOCUMENTS

| | | |
|---|---|---|
| JP | 2009-162215 A | 7/2009 |
| KR | 10-2011-0009444 | 1/2011 |
| KR | 10-2017-0035636 | 3/2017 |

* cited by examiner

*Primary Examiner* — Mahmoud Gimie
(74) *Attorney, Agent, or Firm* — Mintz Levin Cohn Ferris Glovsky and Popeo, P.C.; Peter F. Corless

(57) ABSTRACT

An exhaust gas recirculation (EGR) valve for a vehicle includes: a valve housing connected to an exhaust line, and provided with an inflow passage in which exhaust gas flows, a first outflow passage connected to an EGR line in communication with the inflow passage, a second outflow passage connected to a bypass line bypassing the EGR line, and a third outflow passage connected to an exhaust line connected to a turbocharger turbine; and a valve body selectively opening and closing the first and second outflow passages to adjust an opening ratio of each of first and second outflow passages, and allowing the third outflow passage to remain in an open state.

6 Claims, 8 Drawing Sheets

EXHAUST GAS RECIRCULATION VALVE FOR VEHICLE

CROSS REFERENCE TO RELATED APPLICATION

The present application claims under 35 U.S.C. § 119(a) the benefit of Korean Patent Application No. 10-2017-0113070, filed Sep. 5, 2017, the entire contents of which are incorporated by reference herein.

BACKGROUND

(a) Technical Field

The present disclosure relates generally to an exhaust gas recirculation valve for a vehicle, more particularly, to an exhaust gas recirculation (EGR) valve that is directly connected to an exhaust manifold and provided integrally with an exhaust gas flow passage discharged to an EGR cooler, an exhaust gas flow passage discharged to an EGR cooler bypass, and an exhaust gas flow passage discharged to a turbocharger turbine.

(b) Description of the Related Art

In general, exhaust gas of a vehicle contains toxic substances such as carbon monoxide (CO), nitrogen oxides (NOx), and hydrocarbon (HC), and among the substances generated in a combustion process, there is an inverse relationship between the amount of nitrogen oxides and the amounts of carbon monoxide and hydrocarbons.

In other words, in a practical output range, a maximum amount of nitrogen oxides are generated at a time when the amounts of carbon monoxide and hydrocarbon decrease maximally, and the amount of nitrogen oxides increases as fuel is burned completely, i.e., as a temperature of an engine is high.

Thus, as an allowable amount of exhaust gas such as nitrogen oxides is regulated by related laws, various technologies for reducing exhaust gas have been developed. One of the technologies is exhaust gas recirculation (EGR).

In particular, EGR is a technique for recirculating a part of exhaust gas back to an intake system to lower a combustion temperature in the engine cylinders and limit generation of nitrogen oxides.

FIG. 1 (RELATED ART) is a block diagram showing an example of an EGR system applied to a vehicle.

As shown in FIG. 1, the EGR system applied to a vehicle includes an engine 10, an intake line 11 for sucking air for combustion into the engine 10, an exhaust line 12 in which exhaust gas burned in the engine 10 is exhausted, a turbocharger turbine 30 installed on the exhaust line 12 and converting energy of exhaust gas into a rotational force and recovering the rotational force, an EGR line 21 branched from the exhaust line 12 at a front end of the turbocharger turbine 30 and recirculating a part of exhaust gas to the intake line 11, an EGR cooler 20 installed on the EGR line 21 and cooling exhaust gas, and a bypass line 22 branched from the EGR line 21 and bypassing the EGR cooler 20. In particular, an exhaust gas recirculation (EGR) valve 23 controlling the amount of exhaust gas flowing to the EGR line 21 is provided at a front end or a rear end of the EGR cooler 20, and a bypass valve 24 controlling the amount of exhaust gas bypassing the EGR cooler 20 is provided on the bypass line 22.

When the EGR valve is installed at the front end of the EGR cooler, an exhaust dead volume corresponding to the sum of a volume of an exhaust manifold and a volume of a flow passage of a front end of the EGR cooler is created. When the EGR valve is installed at the rear end of the EGR cooler, the exhaust dead volume is increased by a volume of a core portion of the EGR cooler. Further, when the bypass valve is installed at the rear end of the EGR cooler, the exhaust dead volume is increased by the volume of the bypass line. In other words, the exhaust dead volume is determined according to the installation positions of the EGR valve and the bypass valve. In the case of a commercial vehicle engine requiring low-speed response, the exhaust dead volume has a considerable influence on engine performance.

Therefore, in order to prevent a decrease in turbine response, it is necessary to reduce the exhaust dead volume. For this purpose, the bypass valve must be located at the inlet side of the EGR cooler, which increases the space required for installing a conventional EGR valve and the additional bypass valve. When the bypass valve is installed at the outlet side of the EGR cooler, there is an increase in the risk of the bypass valve seizure due to low temperature fouling as well as increasing the exhaust dead volume. In addition, in order to control the bypass flow rate, an actuator such as a motor for controlling a rotation angle of the bypass valve is required, which results in a problem that the system becomes considerably complicated.

The foregoing is intended merely to aid in the understanding of the background of the present disclosure, and is not intended to mean that the present disclosure falls within the purview of the related art that is already known to those skilled in the art.

SUMMARY

The present disclosure provides an exhaust gas recirculation (EGR) valve for a vehicle, the EGR valve being directly connected to an exhaust manifold and being provided integrally with an exhaust gas flow passage discharged to an EGR cooler, an exhaust gas flow passage discharged to an EGR cooler bypass, and an exhaust gas flow passage discharged to a turbocharger turbine.

In order to achieve the above object, according to one aspect of the present disclosure, there is provided an EGR valve for a vehicle, the EGR valve including: a valve housing connected to an exhaust line, and provided with an inflow passage in which exhaust gas flows, a first outflow passage connected to an EGR line in communication with the inflow passage, a second outflow passage connected to a bypass line bypassing the EGR line, and a third outflow passage connected to an exhaust line connected to a turbocharger turbine; and a valve body selectively opening and closing the first and second outflow passages to adjust an opening ratio of each of first and second outflow passages, and allowing the third outflow passage to remain in an open state.

The EGR valve housing may be internally divided into a first section at which the first and second outflow passages are formed, and a second section at which the third outflow passage is formed, the inflow passage is provided at at least one of the first and second sections, and the valve body may be provided at the first section.

The first and second outflow passages may be arranged to be adjacent to each other at the first section, and the opening ratio may be adjusted while the first and second outflow passages are selectively opened and closed by rotation of the valve body The valve body may include: a drive shaft provided outside the valve housing; and a spool connected to the drive shaft and selectively opening and closing the first and second outflow passages while being rotated by receiving a driving force from the drive shaft.

The spool may be connected at either one of two opposite ends thereof with the drive shaft, and an opening/closing portion selectively opening and closing the first and second outflow passages may be provided at a part of a circumferential surface of the spool, and a flow passage portion having a concave groove shape and through which exhaust gas flows may be formed at a remaining part of the circumferential surface that remains after the opening/closing portion is formed.

The first section of the valve housing may be configured to have a shape corresponding to a rotational radius of the spool, and the first and second outflow passages may be provided on a rotational radius of the opening/closing portion rotated when the spool is rotated, and based on a rotational direction of the spool, a length of the opening/closing portion of the spool may be longer than a sum of a length of the first outflow passage, a length of the second outflow passage, and a length between the first and second outflow passages.

According to the embodiment of the present disclosure, the EGR valve is integrally provided with the first outflow passage connected to the EGR line, the second outflow passage connected to the bypass line, and the third outflow passage connected to the exhaust line connected to the turbocharger turbine, and is directed connected to the exhaust manifold. Thus, it is possible for one EGR valve to control both the flow rate of exhaust gas discharging to the EGR cooler and the flow rate of exhaust gas flowing to the bypass line bypassing the EGR cooler.

In addition, by the integral EGR valve installed directly at the exhaust manifold, the length of the flow passage of the front end of the EGR cooler can be minimized, whereby it is possible to minimize the exhaust dead volume.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
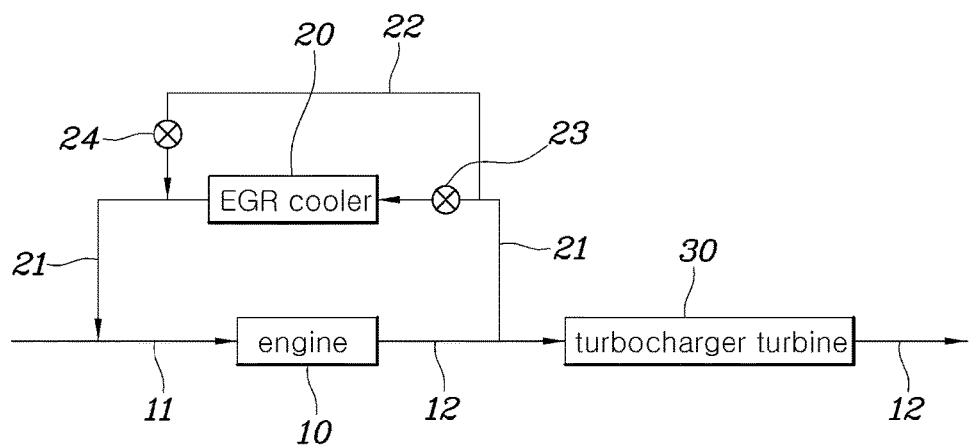
FIG. 1 (RELATED ART) is a view showing an example of an EGR system applied to a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, exemplary embodiments of the present disclosure will be described in detail with reference to the accompanying drawings. Throughout the drawings, the same reference numerals will refer to the same or like parts.

Hereinbelow, to aid in understanding the disclosure, embodiments of the present disclosure will be described in detail with reference to the accompanying drawings. It should be understood that the embodiment of the present disclosure may be changed to a variety of embodiments and the scope and spirit of the present disclosure are not limited to the embodiment described hereinbelow. The embodiment of the present disclosure described hereinbelow is provided for allowing those skilled in the art to more clearly comprehend the present disclosure. Wherever possible, the same reference numerals will be used throughout the drawings and the description to refer to the same or like elements or parts.

Figure 2:
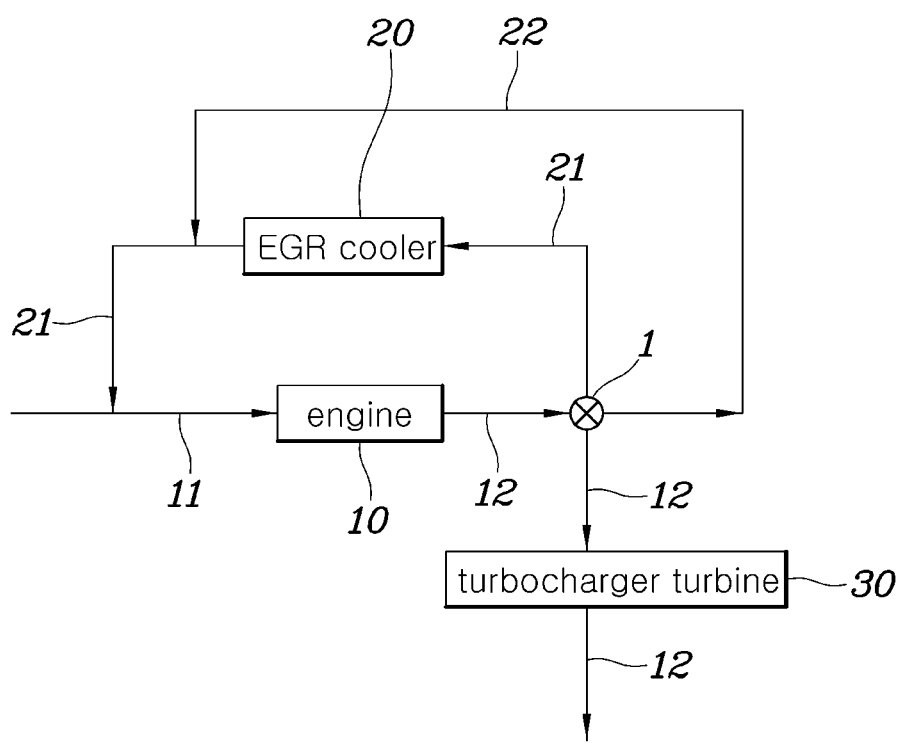
FIG. 2 is a view showing a system to which an EGR valve is applied according to an embodiment of the present disclosure.
Figure 3:
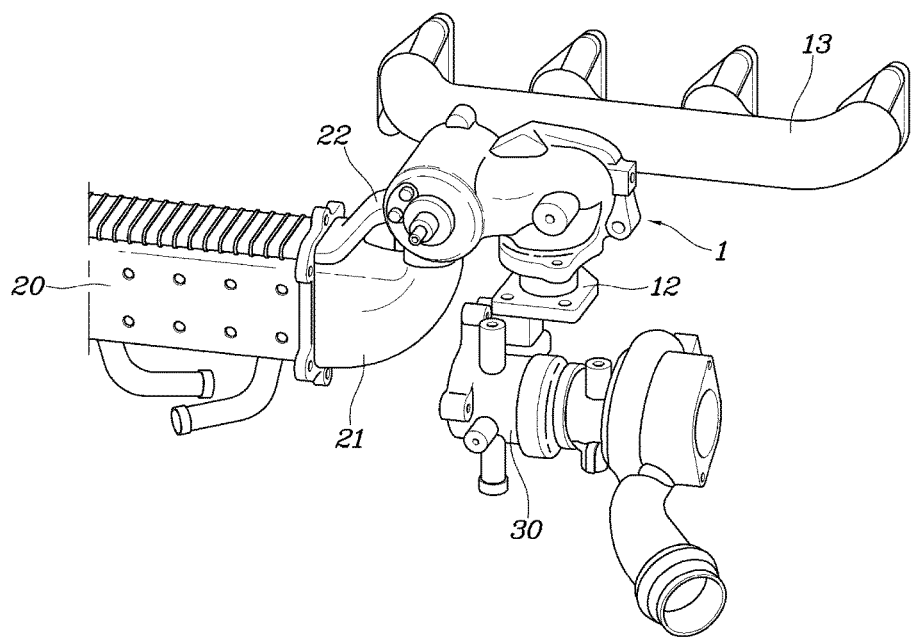
FIG. 3 is a perspective view showing an example in which the EGR valve according to the embodiment of the present disclosure is applied.
Figure 4:
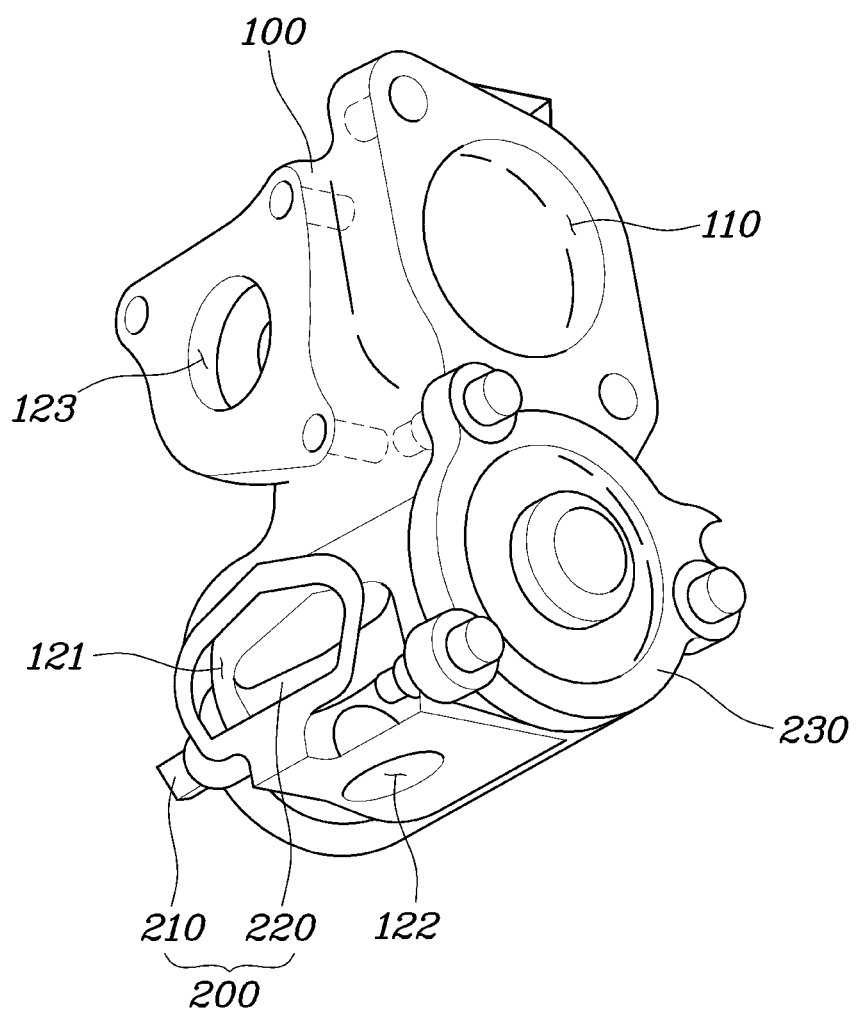
FIG. 4 is a cut-away perspective view showing the EGR valve according to the embodiment of the present disclosure.
Figure 5:
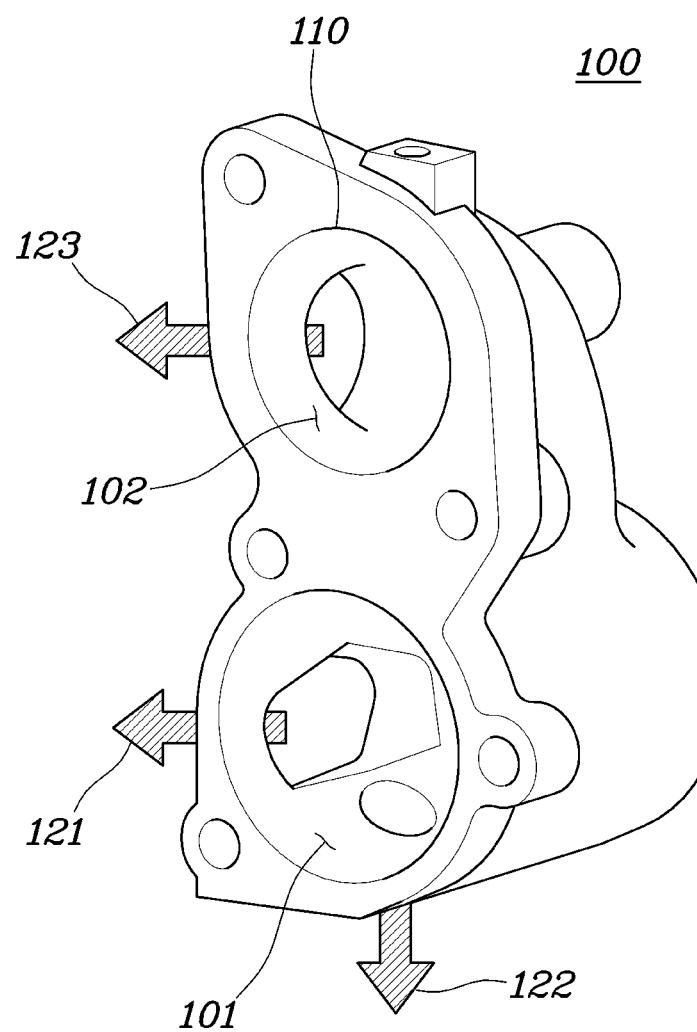
FIG. 5 is a perspective view showing a valve housing of the EGR valve according to the embodiment of the present disclosure.
Figure 6:
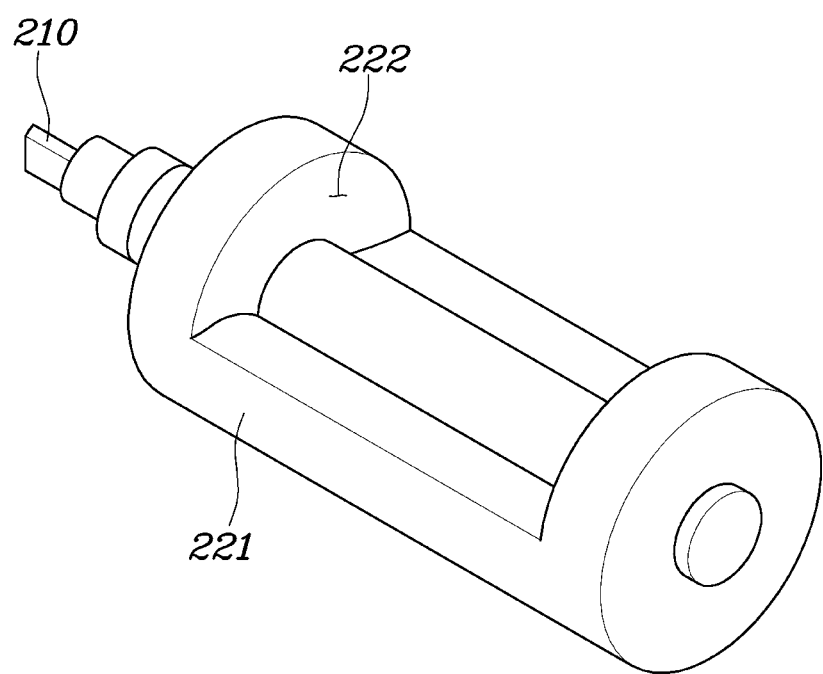
FIG. 6 is a perspective view showing a valve body of the EGR valve according to the embodiment of the present disclosure.
Figure 7:
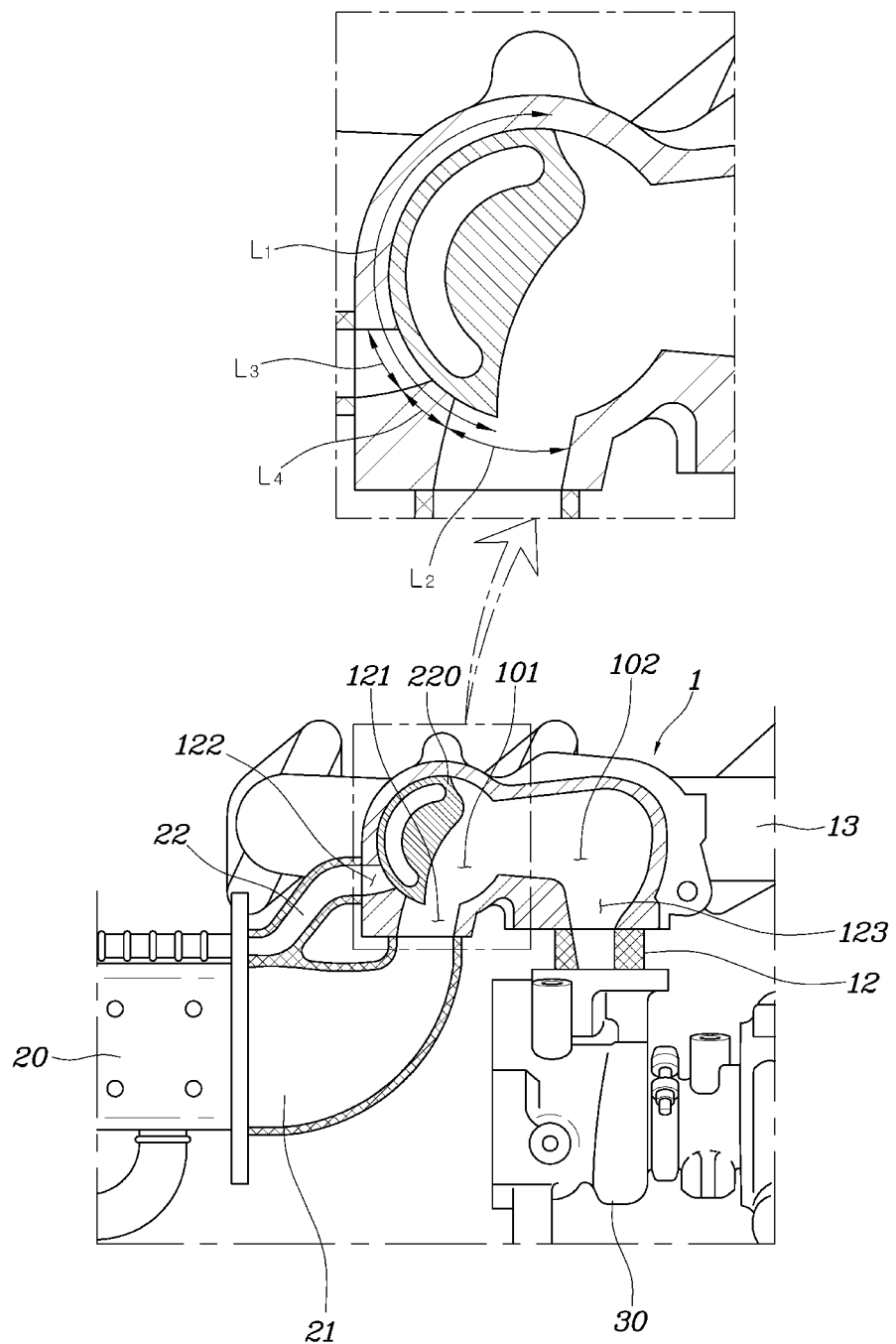
FIGS. 7 and 8 are views showing an operation state of the EGR valve according to the embodiment of the present disclosure.
Figure 8:
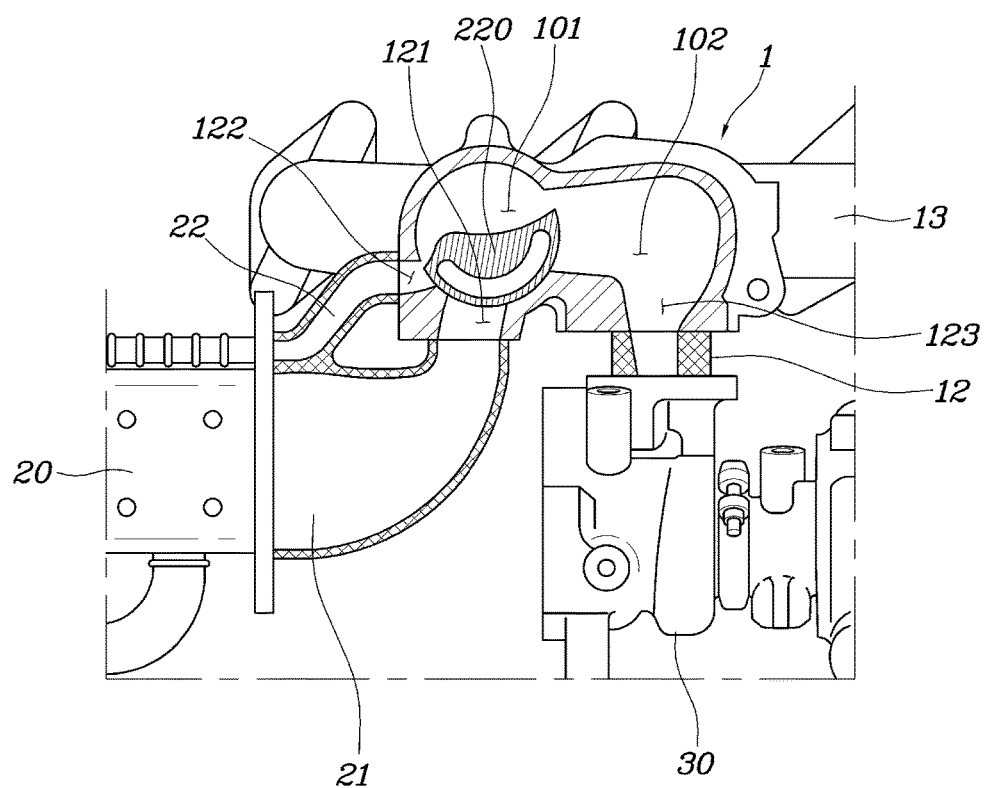

FIG. 2 is a view showing a system to which an EGR valve is applied according to an embodiment of the present disclosure, FIG. 3 is a perspective view showing an example in which the EGR valve according to the embodiment of the present disclosure is applied, FIG. 4 is a cut-away perspective view showing the EGR valve according to the embodiment of the present disclosure, FIG. 5 is a perspective view showing a valve housing of the EGR valve according to the embodiment of the present disclosure, FIG. 6 is a perspective view showing a valve body of the EGR valve according to the embodiment of the present disclosure, and FIGS. 7 and 8 are views showing an operation state of the EGR valve according to the embodiment of the present disclosure.

As shown in FIGS. 2 and 3, the EGR valve 1 according to the embodiment of the present disclosure is an integral valve controlling exhaust gas exhausted from an engine 10 to flow to an EGR line 21, a bypass line 22, and an exhaust line 12 connected to a turbocharger turbine. For this purpose, the EGR valve 1 is connected to an exhaust line 12 connected to the engine 10 or may be directly connected to an exhaust manifold 13, and is branched to the EGR line 21, the bypass line 22, and the exhaust line 12 connected to the turbocharger turbine 30 via the EGR valve 1.

Specifically, the EGR valve 1 according to the embodiment of the present disclosure includes a valve housing 100 connected to the exhaust line 12, and a valve body 200 provided in the valve housing 100 and controlling flow of exhaust gas.

As shown in FIGS. 4 and 5, the valve housing 100 is provided to form a passage through which exhaust gas flows, and may be provided with an inflow passage 110 in which exhaust gas flows, a first outflow passage 121 connected to the EGR line 21 in communication with the inflow passage 110, a second outflow passage 122 connected to the bypass line 22 bypassing the EGR line 21, and a third outflow passage 123 connected to the exhaust line 12 connected to the turbocharger turbine 30.

The valve housing 100 is internally divided into a first section 101 at which the first and second outflow passages 121 and 122 are formed, and a second section 102 at which the third outflow passage 123 is formed. Herein, the inflow passage 110 is provided at at least one of the first and second sections 101 and 102. For example, the inflow passage 110 directly connected to the exhaust manifold 13 may be formed only at the second section 101 rather than the first section 101 for efficient installation of the valve body 200 provided in the valve housing 100.

Meanwhile, the valve body 200 is provided in the valve housing 100 and selectively opens and closes the first and second outflow passages 121 and 122 to adjust an opening ratio of each of the first and second outflow passages 121 and 122. For this purpose, the valve body 200 may be provided at the first section 101 of the valve housing 100, whereby the third outflow passage 123 formed at the second section 102 always remains in an open state.

Specifically, as shown in FIG. 6, the valve body 200 includes a drive shaft 210 provided outside the valve housing 100; and a spool 220 connected to the drive shaft 210 and selectively opening and closing the first and second outflow passages 121 and 122 while being rotated by receiving a driving force.

The drive shaft 210 is connected to a separate driving means and is driven to adjust a rotation angle of the spool 220. Here, the separate driving means may be a motor using electric energy, or may be a device for generating power.

The spool 220 is provided at the first section 101 of the valve housing 100, and is rotated by the driving force received from the drive shaft 210 whereby the spool 220 selectively opens and closes the first and second outflow passages 121 and 122 in accordance with the rotation angle, thereby adjusting the opening ratio of each of the first and second outflow passages 121 and 122.

The spool 220 has a roughly cylindrical shape and the drive shaft 210 is connected to either one of two opposite ends of the spool 220. In addition, a circumferential surface of the spool 220 is divided into an opening/closing portion 221 having a predetermined radius and a flow passage portion 222 having a radius smaller than the radius of the opening/closing portion 221. Thus, the opening/closing portion 221 has the same shape as the side surface of the cylinder, and the flow passage portion 222 has a concave groove shape. Accordingly, the opening/closing portion 221 serves to selectively open and close the first and second outflow passages 121 and 122, and the flow passage portion 222 serves to provide a flow passage through which exhaust gas flows.

In order to open and close the first and second outflow passages 121 and 122 to adjust the opening ratio each of the first and second outflow passages 121 and 122 by the spool 220, the first section 101 of the valve housing 100 may be configured to have a shape corresponding to the rotational radius of the spool 220, and the first and second outflow passages 121 and 122 may be provided on the rotational radius of the opening/closing portion 221 rotated when the spool 220 is rotated. In addition, for efficient rotation and support of the drive shaft 210 and sealing of the first section 101, the first section 101 of the valve housing 100 may be provided with a cover 230 at which the drive shaft 210 is provided.

Herein, the first and second outflow passages 121 and 122 may be arranged to be adjacent to each other at the first section 101. Thus, based on the rotational direction of the spool 220, the length L1 of the opening/closing portion 221 of the spool 220 may be longer than the sum of the length L4 of the first outflow passage 121, the length L2 of the second outflow passage 122, and the length L3 between the first and second outflow passages 121 and 122. Accordingly, by adjusting the rotation angle of the spool 220, the opening ratio of the first and second outflow passages 121 and 122 is adjusted while the first and second outflow passages 121 and 122 are opened and closed (see FIG. 7).

The operation state of the EGR valve according to the embodiment of the present disclosure will be described with reference to the drawings.

FIGS. 7 and 8 are views showing the operation state of the EGR valve according to the embodiment of the present disclosure.

In order to exhaust exhaust gas to the EGR cooler 20 and the turbocharger turbine 30 and to shut off exhaust gas flowing to the bypass line 22, as shown in FIG. 7, the drive shaft 210 is operated to adjust the rotation angle of the spool 220. Herein, the opening/closing portion 221 of the spool 220 is located such that the first outflow passage 121 connected to the EGR line 21 is opened while the second outflow passage 122 connected to the bypass line 22 is closed. Herein, the opening ratio of the first outflow passage 121 can be adjusted by adjusting the rotation angle of the spool 220.

Herein, since the third outflow passage 123 connected to the turbocharger turbine 30 remains in the open state, exhaust gas flows into the third outflow passage 123. However, the flow rate of exhaust gas flowing into the EGR line 21 can be adjusted by adjusting the opening ratio of the first outflow passage 121, whereby the flow rate of exhaust gas flowing to the third outflow passage 123 can be adjusted indirectly.

Meanwhile, in order to allow exhaust gas to flow to the bypass line 22 by preventing exhaust gas from flowing into the EGR cooler 20, as shown in FIG. 8, the drive shaft 210 is operated to adjust the rotation angle of the spool 220. Herein, the opening/closing portion 221 of the spool 220 is located such that the first outflow passage 121 connected to the EGR line 21 is closed while the second outflow passage 122 connected to the bypass line 22 is opened. Herein, the opening ratio of the second outflow passage 122 can be adjusted by adjusting the rotation angle of the spool 220.

In this case, since the third outflow passage 123 connected to the turbocharger turbine 30 is remains in the open state, exhaust gas also flows into the third outflow passage 123. However, the flow rate of exhaust gas flowing into the bypass line 22 can be adjusted by adjusting the opening ratio of the second outflow passage 122, whereby the flow rate of exhaust gas flowing to the third outflow passage 123 can be adjusted indirectly.

Although the preferred embodiment of the present disclosure has been disclosed for illustrative purposes, the scope of the present disclosure is defined by the accompanying claims rather than the description which is presented above. Therefore, those skilled in the art will appreciate that various modifications, additions and substitutions are possible, without departing from the scope and spirit of the disclosure as disclosed in the accompanying claims.

What is claimed is:

1. An exhaust gas recirculation (EGR) valve for a vehicle, the EGR valve comprising:
    a valve housing connected to an exhaust line, and provided with an inflow passage in which exhaust gas flows, a first outflow passage connected to an EGR line in communication with the inflow passage, a second outflow passage connected to a bypass line bypassing the EGR line, and a third outflow passage connected to an exhaust line connected to a turbocharger turbine; and
    a valve body selectively opening and closing the first and second outflow passages to adjust an opening ratio of each of first and second outflow passages, and allowing the third outflow passage to remain in an open state,
    wherein each of the inflow passage, the first outflow passage, the second outflow passage, and the third outflow passage is integrally formed with the valve housing,
    wherein the EGR valve is directly connected to an exhaust manifold of an engine of the vehicle, and
    wherein the EGR line, the bypass line, and the exhaust line are branched from the exhaust manifold via the EGR valve.

2. The EGR valve of claim 1, wherein the valve housing is internally divided into a first section at which the first and second outflow passages are provided, and a second section at which the third outflow passage is provided, the inflow passage is provided at at least one of the first and second sections, and the valve body is provided at the first section.

3. The EGR valve of claim 2, wherein the first and second outflow passages are arranged to be adjacent to each other at the first section, and the opening ratio is adjusted while the first and second outflow passages are selectively opened and closed by rotation of the valve body.

4. The EGR valve of claim 2, wherein the valve body includes:
    a drive shaft provided outside the valve housing; and
    a spool connected to the drive shaft and selectively opening and closing the first and second outflow passages while being rotated by receiving a driving force from the drive shaft.

5. The EGR valve of claim 4, wherein the spool is connected at either one of two opposite ends thereof with the drive shaft, and
    an opening/closing portion selectively opening and closing the first and second outflow passages is provided at a part of a circumferential surface of the spool, and a flow passage portion having a concave groove shape and through which exhaust gas flows is formed at a remaining part of the circumferential surface that remains after the opening/closing portion is formed.

6. The EGR valve of claim 5, wherein the first section of the valve housing is configured to have a shape corresponding to a rotational radius of the spool, and the first and second outflow passages are provided on a rotational radius of the opening/closing portion rotated when the spool is rotated, and
    based on a rotational direction of the spool, a length of the opening/closing portion of the spool is longer than a sum of a length of the first outflow passage, a length of the second outflow passage, and a length between the first and second outflow passages.

* * * * *